（12) United States Patent
Zhou et al.

(10) Patent No.: US 9,175,780 B2
(45) Date of Patent: Nov. 3, 2015

(54) BUTTON SWITCH THREE-WAY VALVE

(75) Inventors: Huasong Zhou, Xiamen (CN); Fuli Guo, Xiamen (CN); Jianmin Chen, Xiamen (CN); Bin Chen, Xiamen (CN)

(73) Assignees: XIAMEN SOLEX HIGH-TECH INDUSTRIES CO., LTD., Xiamen (CN); Huasong Zhou, Xiamen (CN)

( * ) Notice: Subject to any disclaimer, the term of this patent is extended or adjusted under 35 U.S.C. 154(b) by 272 days.

(21) Appl. No.: 13/824,377

(22) PCT Filed: Sep. 30, 2011

(86) PCT No.: PCT/CN2011/080423
§ 371 (c)(1),
(2), (4) Date: Mar. 17, 2013

(87) PCT Pub. No.: WO2012/041249
PCT Pub. Date: Apr. 5, 2012

(65) Prior Publication Data
US 2013/0167959 A1    Jul. 4, 2013

(30) Foreign Application Priority Data

Sep. 30, 2010 (CN) .......................... 2010 1 0297035
Sep. 30, 2010 (CN) .......................... 2010 2 0548603

(51) Int. Cl.
*F16K 11/16*    (2006.01)
*F16K 11/18*    (2006.01)
*F16K 31/44*    (2006.01)
(Continued)

(52) U.S. Cl.
CPC ............... *F16K 11/20* (2013.01); *F16K 11/168* (2013.01); *B05B 1/1609* (2013.01); *E03C 2201/30* (2013.01); *H01H 23/30* (2013.01); *Y10T 137/86879* (2015.04)

(58) Field of Classification Search
CPC ......... H01H 23/30; F16K 11/20; F16K 11/22; F16K 31/60; F16K 11/168; B05B 1/1609; E03C 1/023; E03C 2201/30
USPC .......................... 137/636, 637, 867; 251/297
See application file for complete search history.

(56) References Cited

U.S. PATENT DOCUMENTS 1,478,289 A  *  12/1923  Mahoney ..................... 137/636
1,647,983 A  *  11/1927  Bloch ........................... 137/360
(Continued)

FOREIGN PATENT DOCUMENTS

CN    201318476 Y    9/2009
CN    201787130 U    4/2011
(Continued)

*Primary Examiner* — John Fox
*Assistant Examiner* — Seth W Mackay-Smith
(74) *Attorney, Agent, or Firm* — Rabin & Berdo, P.C.

(57) ABSTRACT

A button switch three-way valve includes a fixation unit disposed with an inlet waterway and two outlet waterways. A priority valve is disposed between each outlet waterway and the inlet waterway. The on-off of the outlet waterway to the inlet waterway is controlled by the sliding of the valve shaft in each priority valve. The fixation unit is disposed with two control surfaces opposite to each other, each disposed with lock grooves. A button is disposed between the two control surfaces, with a central part and two connection parts in the two sides of the central part. The central part is pivot joint to the fixation unit. Two connection parts are separately connected to the two valve shafts to control the sliding of the two valve shafts, the exterior sides of the two connection parts are disposed with lock tooth to couple to the lock grooves.

14 Claims, 13 Drawing Sheets

(51) Int. Cl.
  *F16K 11/20* (2006.01)
  *H01H 23/30* (2006.01)
  *B05B 1/16* (2006.01)

(56) References Cited

U.S. PATENT DOCUMENTS

| | | | |
|---|---|---|---|
| 1,671,672 A * | 5/1928 | Daniels | 210/91 |
| 1,764,005 A * | 6/1930 | Cochin | 137/595 |
| 2,936,001 A | 5/1960 | Legrand, et al. | |
| 3,342,967 A * | 9/1967 | Brand et al. | 200/531 |
| 3,753,447 A | 8/1973 | Davis et al. | |
| 3,952,764 A | 4/1976 | Keller, III | |
| 4,013,858 A * | 3/1977 | Grebner et al. | 200/43.04 |
| 4,080,992 A * | 3/1978 | Niederer | 137/636 |
| 4,777,981 A * | 10/1988 | Petro | 137/636.2 |
| 5,095,181 A * | 3/1992 | Osika et al. | 200/43.16 |
| 5,433,248 A * | 7/1995 | Schmidt | 137/625.48 |
| 5,566,710 A * | 10/1996 | Dahlgren et al. | 137/556 |
| 5,638,866 A * | 6/1997 | Mueller | 137/636.2 |
| 6,742,542 B1 * | 6/2004 | Dierks | 137/636 |
| 8,094,851 B2 * | 1/2012 | Heerlein et al. | 381/324 |

FOREIGN PATENT DOCUMENTS

| | | |
|---|---|---|
| CN | 102094997 A | 6/2011 |
| DE | 2152133 B1 | 2/1973 |
| JP | 61201969 A | 9/1986 |

* cited by examiner

BUTTON SWITCH THREE-WAY VALVE

FIELD OF THE INVENTION

The present invention relates to a button switch three-way valve.

BACKGROUND OF THE INVENTION

The existing three-way valve includes a body and a valve spool. The body is disposed with an inlet waterway and two outlet waterways. The two outlet waterways are connected to the inlet waterway. The valve spool is rotated and connected to the body inside. The two outlet waterways are switched to connect to the inlet waterway by the relatively rotation of the valve spool and the body. This kind of switch of waterways by rotating the valve spool has disadvantages as below: it needs large switch force, and the switch is inconvenient.

SUMMARY OF THE INVENTION

The present invention is provided with a button switch three-way valve, which overcomes the problems of the existing three-way valve that it needs large switch force and the switch is inconvenient.

The technical proposal of the present invention to solve the technical problem is as below:

A button switch three-way valve includes a fixation unit (100), the fixation unit 100 is disposed with an inlet waterway (110), an outlet waterway I (120) and an outlet waterway II (130), a priority valve I (140) is disposed between the outlet waterway (120) and the inlet waterway (110), a priority valve II (150) is disposed between the outlet waterway (130) and the inlet waterway (110), the priority valve (140) is disposed with a valve shaft I (141), the priority valve II (150) is disposed with a valve shaft II (151), the on-off of the outlet waterway I (120) to the inlet waterway (110) is controlled by the sliding of the valve shaft I (141), the on-off of the outlet waterway II (130) to the inlet waterway (110) is controlled by the sliding of the valve shaft II (151); the fixation unit (100) is disposed with a control surface I (161) and a control surface II (162) of opposite to each other, the control surface I (161) is disposed with lock grooves I (1611) and the control surface II (162) is separately disposed with lock grooves II (1621); a button (200) is further disposed between the control surfaces I (161) and the control surface II (162), the button (200) is disposed with a central part (270), a connection part I (210) and a connection part II (220) in the two sides of the central part (270), the central part (270) is pivot joint to the fixation unit (100), the connection part I (210) and the connection part II (220) are separately connected to the valve shaft I (141) and the valve shaft II (151) to control the sliding of the valve shaft I (141) and the valve shaft II (151), the exterior sides of the connection part I (210) is disposed with a lock tooth I (212) to couple to the lock grooves I (1611) and the connection part II (220) is disposed with a lock tooth II (222) to couple to the lock grooves II (1621).

In another preferred embodiment, the control surfaces I (161) and the control surface II (162) are separately disposed with two lock grooves, the button (200) can swing relatively to the fixation unit (100) from side to side and can be situated in a first state, a second state and a third state, thereinto:

When the button (200) is situated in the first state, the lock tooth I (212) of the connection part I (210) is coupled to the lower lock groove of the control surface I (161), the lock tooth II (222) of the connection part II (220) is situated above the control surface II (162), the priority valve I (140) is turned on, the priority valve II (150) is cut off;

When the button (200) is situated in the second state, the lock tooth I (212) of the connection part I (210) and the connection part II (220) are coupled to the upper lock groove of the control surface I (161) and the control surface II (162), the priority valve I (140) and the priority valve II (150) are turned on;

When the button (200) is situated in the third state, the lock tooth II (222) of the connection part II (220) is coupled to the lower lock groove of the control surface II (162), the lock tooth I (212) of the connection part I (210) is situated above the control surface I (161), the priority valve II (150) is turned on, the priority valve I (140) is cut off.

In another preferred embodiment, the control surface I (161) and the control surface II (162) are separately disposed with three lock grooves, the button (200) can swing relatively to the fixation unit (100) from side to side and can be situated in a first state, a second state and a third state, thereinto:

When the button (200) is situated in the first state, the lock tooth I (212) of the connection part I (210) is coupled to the lower lock groove of the control surface I (161), the lock tooth II (222) of the connection part II (220) is situated in the upper lock groove of the control surface II (162), the priority valve I (140) is turned on, the priority valve II (150) is cut off;

When the button (200) is situated in the second state, the lock tooth I (212) of the connection part I (210) and the connection part II (220) are coupled to the central lock groove of the control surface I (161) and the control surface II (162), the priority valve I (140) and the priority valve II (150) are turned on;

When the button (200) is situated in the third state, the lock tooth II (222) of the connection part II (220) is coupled to the lower lock groove of the control surface II (162), is situated in the upper lock groove of the control surface I (161), the priority valve II (150) is turned on, the priority valve I (140) is cut off.

In another preferred embodiment, the fixation unit (100) includes a body (170) and a priority valve cover (180); the body (170) is disposed with an inlet (111), an outlet I (121), an outlet II (131) and an assembly groove (171), the assembly groove (171) is disposed to connect the inlet (111) to the outlet I (121) and the outlet II (131); the priority valve cover (180) is disposed with a stepped hole I (181) and a stepped hole II (182) of big end down, the priority valve I (140) and the priority valve II (150) are separately assembled to the big holes of the stepped hole I (181) and the stepped hole II (182), making the end of the valve shaft I (141) and the valve shaft II (151) separately sliding and running through the small holes of the stepped hole I (181) and the stepped hole II (182); the priority valve cover (180) is assembled in the assembly groove (171) of the body (170) to form the inlet waterway (110), the outlet waterway I (120) and the outlet waterway II (130), making the priority valve I (140) connected to the outlet waterway I (120) and inlet waterway (110) and the priority valve II (150) connected to the outlet waterway II (130) and the inlet waterway.

In another preferred embodiment, the priority valve cover (180) is disposed with a pivot seat (183) in the central, the pivot seat (183) is disposed with a pivot groove (1831); two sides of the priority valve cover (180) are separately disposed with a control seat I (184) and a control seat (185), the opposite sides of the control seat I (184) and the control seat II (185) are the control surface I (161) and the control surface II (162); the central of the button (200) is pivot joint to the pivot groove (1831) of the pivot seat (183).

In another preferred embodiment, the fixation unit (100) is further includes a cover (190), the cover (190) is covered on the body (170), the cover (190) is disposed with a through hole (191), the through hole (191) is corresponding to the priority valve cover (180), the button (200) is exposed out of the through hole (191).

In another preferred embodiment, the valve shaft I (141) is concaved and disposed with a sliding groove (1411), the valve shaft II (151) is concaved and disposed with a sliding groove II (1511); the connection part I (210) of the button (200) is disposed with a connection groove I (211) of opening downfacing, the connection part II (220) of the button (200) is disposed with a connection groove II (221) of opening downfacing the opening of the connection groove I (211) and the connection groove II (221) are separately extended inwards to form a connection edge;

The valve shaft I (141) and the valve shaft II (151) are separately connected to the connection groove I (211) and the connection groove II (221); the connection edges of the connection groove I (211) and the connection groove II (221) are separately coupled and connected to the sliding groove I (1411) and the sliding groove II (1511).

In another preferred embodiment, the top surface of the button (200) is concaved and arc shaped.

Another technical proposal of the present invention is as below:

A button switch three-way valve includes a fixation unit, the fixation unit (100) is disposed with an inlet waterway, an outlet waterway I (120) and an outlet waterway II (130), a priority valve I (140) is disposed between the outlet waterway I (120), a priority valve II (150) is disposed between the outlet waterway II (130) and the inlet waterway (110), the priority valve I (140) and the priority valve II (150) are separately disposed with a valve shaft I (141) and a valve shaft II (151), the on-off of the outlet waterway I (120) to the inlet waterway (110) is controlled by the sliding of the valve shaft I (141), the on-off of the outlet waterway II (130) to the inlet waterway (110) is controlled by the sliding of the valve shaft II (151); the button (200) is disposed with a central part (270), a connection part I (210) and a connection part II (220) in the two sides of the central part (270), the central part (270) is pivot joint to the fixation unit (100), the connection part I (210) and the connection part II (220) are separately connected to the valve shaft I (141) and the valve shaft II (151) to control the sliding of the valve shaft I (141) and the valve shaft II (151).

In another preferred embodiment, the fixation unit (100) is disposed with a control surface I (161) and a control surface II (162) of opposite to each other; a sliding groove is disposed between the control surface I (161) and the control surface II (162), the central of the sliding groove (163) is disposed with at least a positioning concave spot (164);

An elastic contact (260) is disposed below the central of the button (200) and can be sliding along the sliding groove (163).

In another preferred embodiment, the button (200) is assembled outside the control surface I (161) and the control surface II (162), a clearances is disposed between the inner wall of one end of the button (200) and the control surface I (161), a clearance is disposed between the inner wall of the other end of the button (200) and the control surface II (162); the button (200) can swing from side to side relatively to the fixation unit (100) and can be situated in a first state, a second state and a third state, thereinto:

When the button (200) is situated in the first state, the inner wall of one end of the button (200) is withstood the control surface I (161), the priority valve I (140) is turned on, the priority valve II (150) is cut off;

When the button (200) is situated in the second state, the elastic contact (260) of the button (200) is situated in the positioning concave spot (164) of the sliding groove (163); the priority valve I (140) and the priority valve II (150) are turned on;

When the button (200) is situated in the third state, the inner wall of one end of the button (200) is withstood the control surface II (162), the priority valve I (140) is turned on, the priority valve II (150) is cut off.

Compared to the existing technology, the technical proposal of the present invention has advantages as below:

1. The there way valve, the priority valve, the button and the lock catch structure (the cooperation of the lock grooves and the lock tooth) are cleverly combined; the sliding of the valve shaft is controlled by the swinging of the button, the on-off of the priority valve is controlled by the sliding of the valve shaft, the switch of at least two outlet waterways to connect to the inlet waterway is controlled by the on-off of the priority valve, so that the switch is energy saving, the switch is not influenced by the water pressure, the switch state is held and the switch is convenient;

2. Three outlet states are being held, which is realized by the cooperation of the three-way valve, the priority valve, the button and the lock catch structure, the structure is simple and the switch is convenient;

3. The fixation unit includes a body and a priority valve cover, the priority valve cover is assembled inside the assembly groove of the body to form the inlet waterway and the outlet waterways, the priority valve is assembled between each outlet waterway and the inlet waterway, the structure is clever and simple with small size.

4. The priority valve cover is pivot joint with a pivot seat and a control seat, the pivot seat is disposed with a pivot groove, the control seat is disposed with control surface, the structure is simple, it works easy with low cost;

5. The top surface of the button is concaved and arc shaped for user's finger to switch;

6. The valve shaft is connected to the connection groove of the button, the connection edge of the connection groove is coupled to the sliding groove of the valve shaft, so that the valve shaft moves up and down when the connection groove of the button swings, the assembly is easy and the driving is clever.

BRIEF DESCRIPTION OF THE DRAWINGS

The present invention will be further described with the drawings and embodiments.

DETAILED DESCRIPTION OF THE EMBODIMENTS

The First Embodiment

Figure 1:
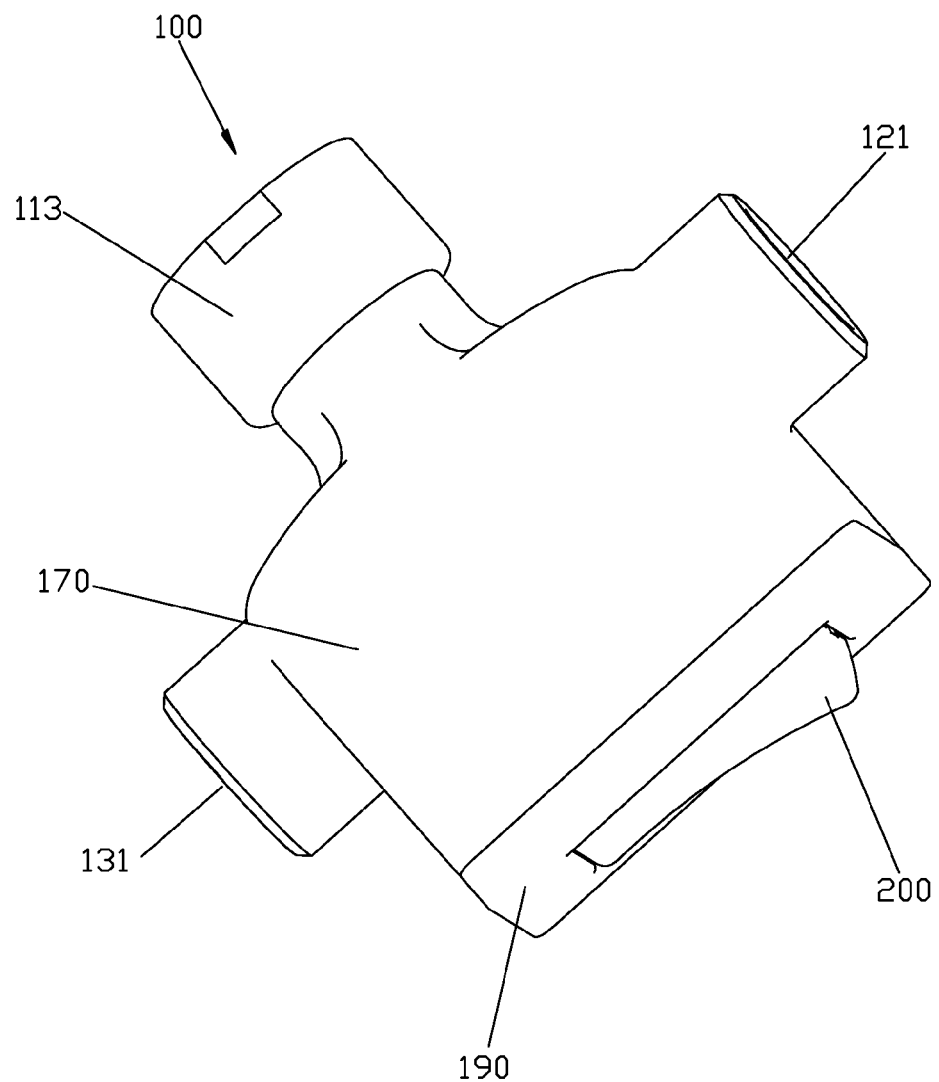
FIG. 1 illustrates the structure of the first embodiment of the present invention.
Figure 2:
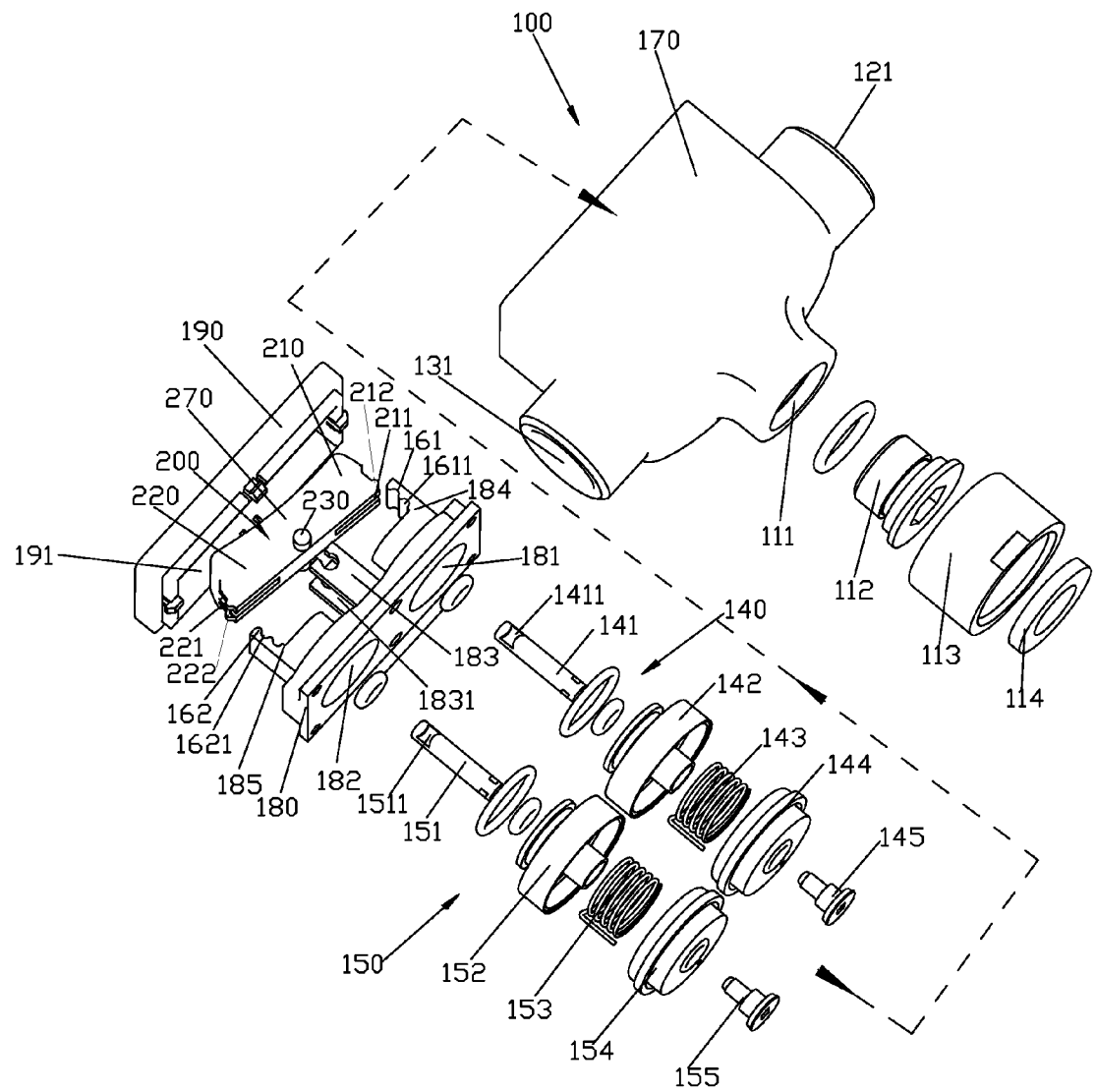
FIG. 2 illustrates the breakdown structure of the first embodiment of the present invention.
Figure 3:
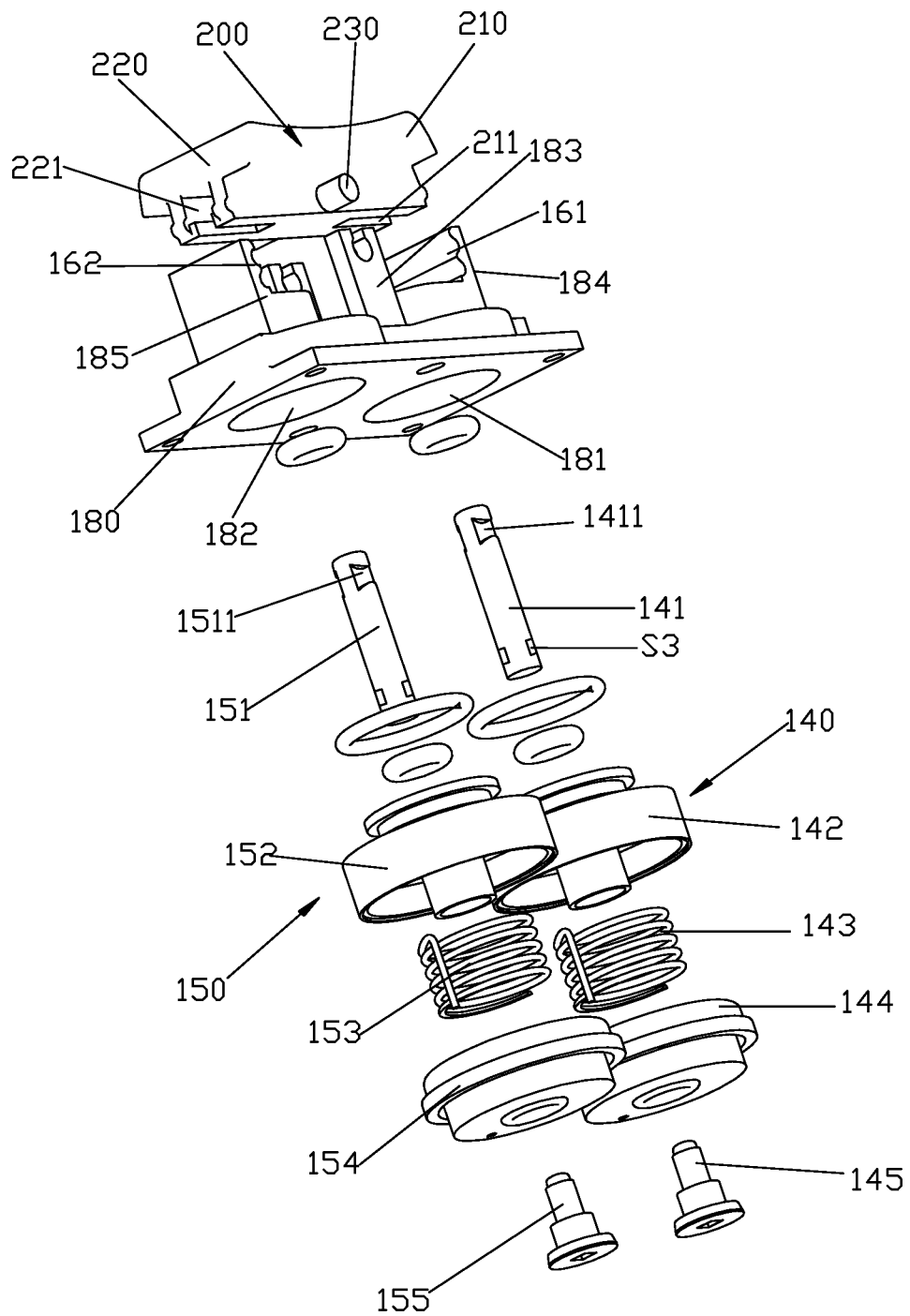
FIG. 3 illustrates the breakdown structure of the priority valve I, the priority valve II, the priority valve cover and the button of the first embodiment of the present invention.
Figure 5:
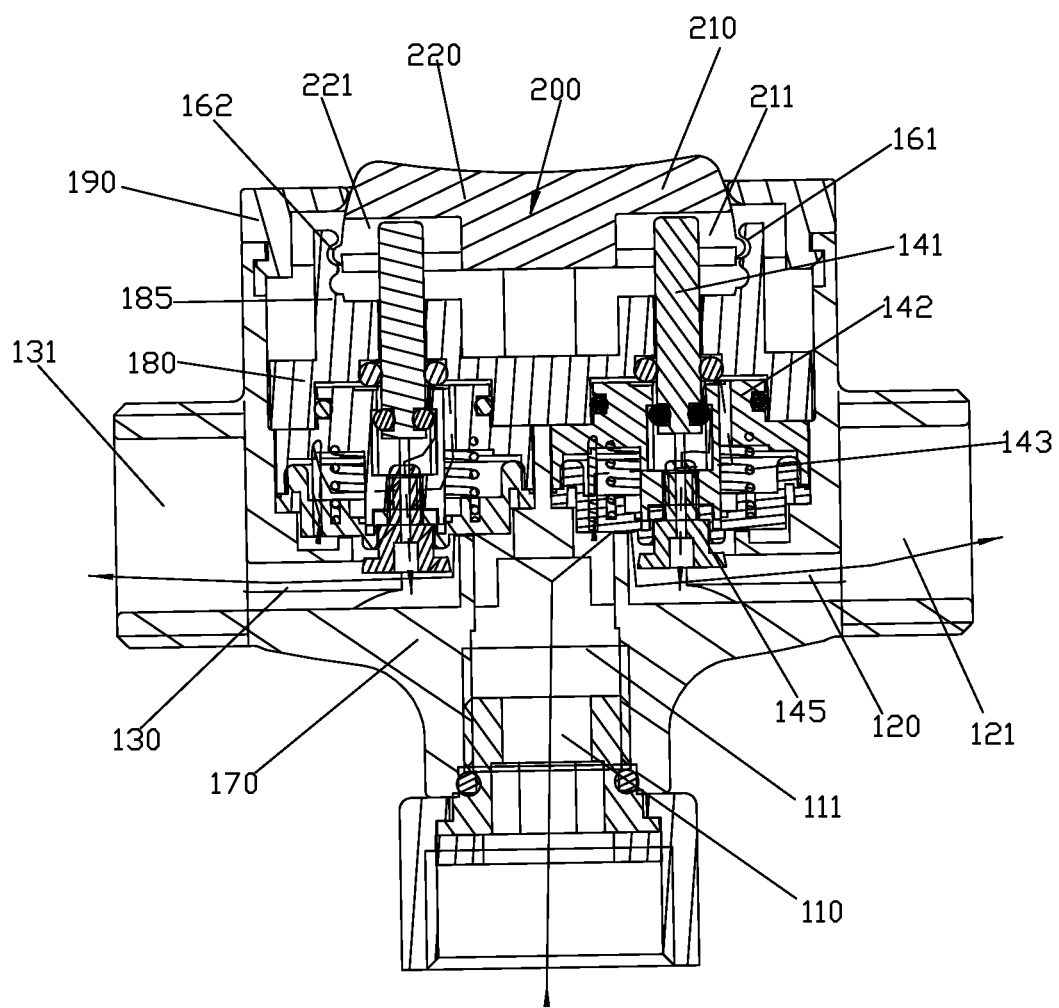
FIG. 5 illustrates the sectional view of the first embodiment when the three-way valve is situated in the second state.
Figure 6:
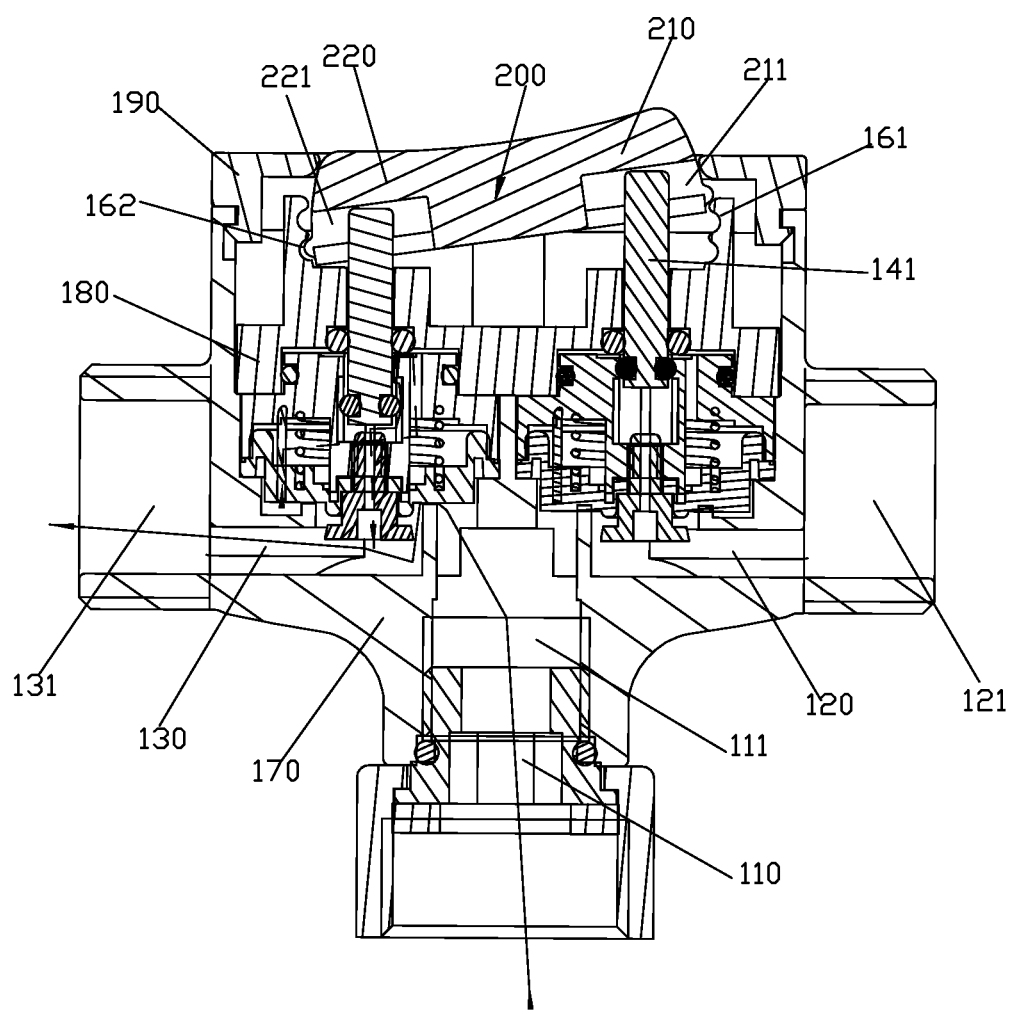
FIG. 6 illustrates the sectional view of the first embodiment when the three-way valve is situated in the third state.
Figure 7:
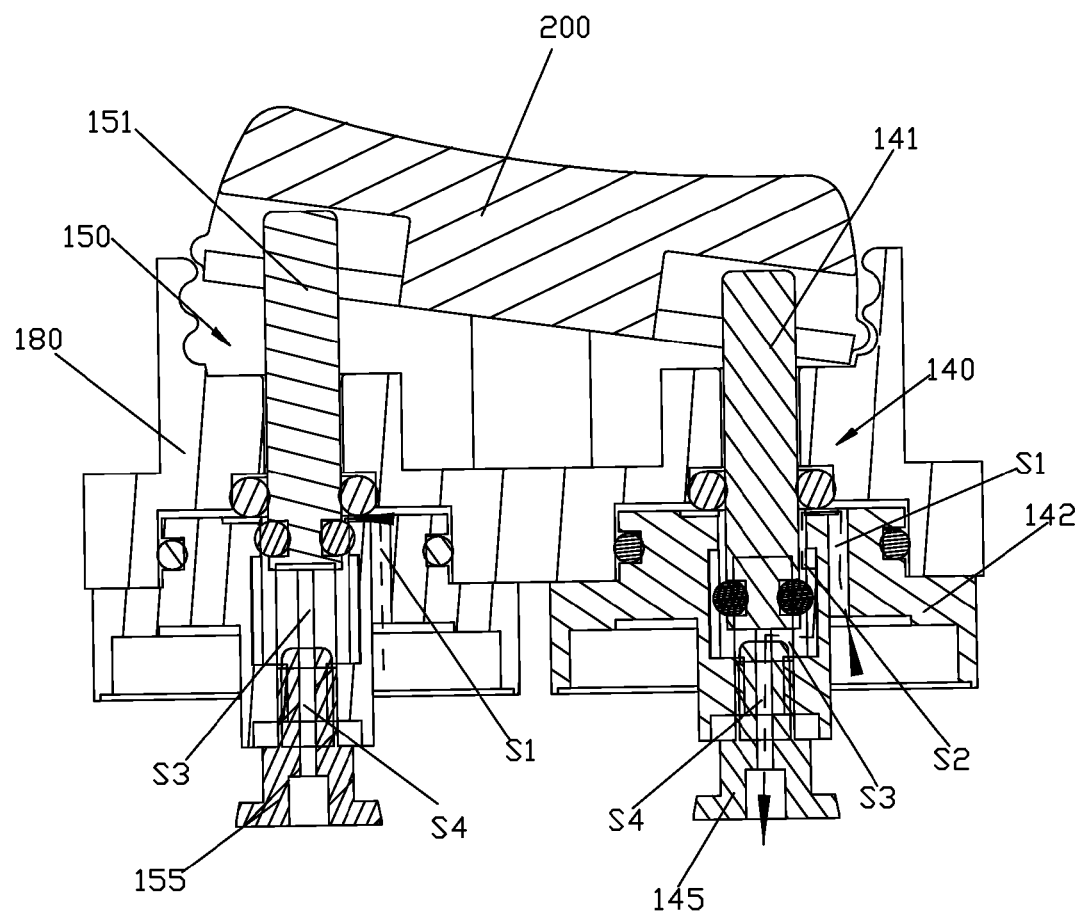
FIG. 7 illustrates the decompression of the priority valve I of the first embodiment of the present invention.

Refer to the FIG. 1 to the FIG. 6. A button switch three-way valve includes a fixation unit 100 and a button 200. The fixation unit 100 is disposed with an inlet waterway 110, an outlet waterway I 120 and an outlet waterway II 130. A priority valve I 140 is connected between the outlet waterway I 120 and the inlet waterway 110, and a priority valve II 150 is connected between the outlet waterway II 130 and the inlet waterway 110. The priority valve I 140 has a valve shaft I 141, a priority valve body I 142, a spring I 143, a rubber block I 144 and a priority valve spool I 145, and the priority valve II 150 is disposed with a valve shaft II 151, a priority valve body II 152, a spring II 153, a rubber block II 154 and a priority valve spool II 155. The priority valve I and the priority valve II are existing technology and not further described here. The valve shaft I 141 and the valve shaft II 151 are separately sliding up and down in an upper, central and lower control position in the fixation unit 100. The decompression of the decompression waterway I of the priority valve I 140 is controlled by the sliding up and down of the valve shaft I 141, and the decompression of the decompression waterway II of the priority valve II 150 is controlled by the sliding up and down of the valve shaft II 151 (as figured in the broken line of the FIG. 4, FIG. 5, FIG. 6 and FIG. 7). Whether the priority valve is turned on or not is controlled by the decompression of the decompression waterway I or the decompression waterway II to control the outlet waterway I 120 or the outlet waterway II 130 to connect to the inlet waterway 110. Please refer to the FIG. 7, in this embodiment, the rubber block I 144 and the rubber block II 154 are separately disposed with a throughout thin hole; the spring I 143 and the spring II 153 are separately disposed with a plug end, which is plugged into the throughout thin hole; the water of the inlet waterway 110 flows into the rubber block I and the priority valve body I (a water receiver I) or the water of the inlet waterway 110 flows into the rubber block II and the priority valve body II (a water receive II) through the throughout thin hole. The decompression waterway I includes a damping hole I S1 disposed in the priority valve body I and connected to the water receiver, a clearance I S2 disposed between the priority valve body I and the valve shaft I, a groove I S3 disposed in the priority valve body I and a central hole I S4 of the valve spool I. The decompression waterway II includes a damping hole II S1 disposed in the priority valve body II and connected to the water receiver II, a clearance II S2 disposed between the priority valve body II and the valve shaft II, a groove II S3 disposed in the priority valve body II and a central hole II S4 of the valve spool II. As figured in the FIG. 7, when the valve shaft II 150 is situated in the upper control position, the clearance II S2 is blocked, the decompression waterway II is closed, the priority valve II 150 is cut off, the outlet waterway II 130 is not connected to the inlet waterway 110; as figured in the FIG. 7, when the valve shaft I 140 is situated in the central and lower control position, the clearance I S2 is opened, the water flows through the damping hole of the priority valve body I, the clearance I of the valve shaft I and the priority valve body I, the groove of the priority valve body I, the central hole of the valve spool I, then it decompresses, the priority valve I 140 is turned on, the outlet waterway I 120 is connected to the inlet waterway 110.

In this embodiment, the left and right side of the upper part of the valve shaft I 141 and the valve shaft II 151 are concaved and disposed with a level sliding groove I 1411 and a sliding groove II 1511 of throughout left and right.

The fixation unit 100 includes a body 170, a priority valve cover 180 and a cover 190. The body 170 is disposed with an inlet 111, an outlet I 121, an outlet II 131 and an assembly groove 171. The assembly groove 171 is connected to the inlet 111, the outlet I 121 and the outlet II 131. In this embodiment, the inlet 111 is further disposed with a joint screw 112, a joint 113 and a rubber block 114 to seal and connect to the water resource.

The priority valve cover 180 is disposed with a stepped hole I 181 and a stepped hole II 182 of big end down and throughout up and down. The central of the top surface of the priority valve cover 180 is disposed with a pivot seat 183; the pivot seat 183 is disposed with a pivot groove 1831. The pivot groove 1831 includes a pivot hole and an opening connected to the pivot hole. The size of the opening is slightly smaller than the diameter of the pivot hole for easily assembly (the pivot shaft is assembled into the pivot hole by elastic deformation) and structural solid. Two sides of the top surface of the priority valve cover 180 are separately disposed with a control seat I 184 and a control seat II 185. The opposite surfaces of the control seat I 184 and the control seat II 185 are the control surface I 161 and the control surface II 162. The control surface I 161 and the control surface II 162 are separately disposed with two lock grooves with an interval up and down.

The priority valve I 140 and the priority valve II 150 are separately assembled inside the big holes of the stepped hole I 181 and the stepped hole II 182, making the ends of the valve shaft I 141 and the valve shaft II 151 separately sliding and running through the small holes of the stepped hole I 181 and the stepped hole II 182. The priority valve cover 180 is assembled inside the assembly groove 171 of the body 170, forming the inlet waterway 110, the outlet waterway I 120 and the outlet waterway II 130. The priority valve I 140 is disposed between the outlet waterway 120 and inlet waterway 110, and the priority valve II 150 is disposed between the outlet waterway 130 and the inlet waterway 110. The on-off of the outlet waterway I 120 to the inlet waterway 110 is controlled by the priority valve I 140, and the on-off of the outlet waterway II 130 to the inlet waterway 110 is controlled by the priority valve II 150.

The button 200 is disposed with a central part 270, a connection part I 210 and a connection II 220 in the two sides of the central part 270; the central part 270 is pivot joint to the fixation unit 100. The front and back of the central part 270 are concaved and disposed with a pivot shaft 230; the connection part I 210 is disposed with a connection groove I 211 of opening down-facing, the edge of the opening of the connection groove I 211 is extended downward to form connection edge, the exterior sides of the connection groove I 211 is disposed in the end of the button 200 to assemble the upper end of the valve shaft I 141 into the connection groove I 211; the exterior sides of the connection part I 210 is disposed with lock tooth I 212 coupled to the lock grooves. The connection part II 220 is disposed with a connection groove II 221 of opening down-facing, the edge of the opening of the connection grooves II 221 is extended downward to form connection edge, the exterior sides of the connection groove II 221 is disposed in the end of the button 200 to assemble the upper end of the valve shaft II 151 into the connection groove II 221; the exterior sides of the connection part II 220 is disposed with lock tooth II 222 coupled to the lock grooves. In this embodiment, the top surface of the button 200 is concaved and arc shaped. The pivot shaft 230 of the button 200 is pivot joint to the pivot hole of the pivot groove 1831 of the pivot seat 183; the button is situated between the control seat I 184 and the control seat II 185; the lock tooth I 212 of the connection part I 210 and the lock tooth II 222 of the connection part II 220 are separately coupled to the lock grooves of the control seat I 184 and the control seat II 185; the upper ends of the valve shaft I 141 and the valve shaft II 151 are separately connected to the connection groove I 211 and the connection groove II 221; the connection edges of the connection groove I 211 and the connection groove II 221 are separately coupled and connected to the sliding groove I 1411 and the sliding groove II 1511, making the valve shaft I 141 and the valve shaft II 151 sliding up and down when the button 200 swings left and right.

The cover 190 is covered on the body 170, the cover 190 is disposed with a through hole 191, the through hole 191 is corresponding to the priority valve cover 180, the button 200 is exposed out of the through hole 191 for user's press; the connection part I and the connection part II of the button 200 will not be detached from the through hole 191.

Figure 4:
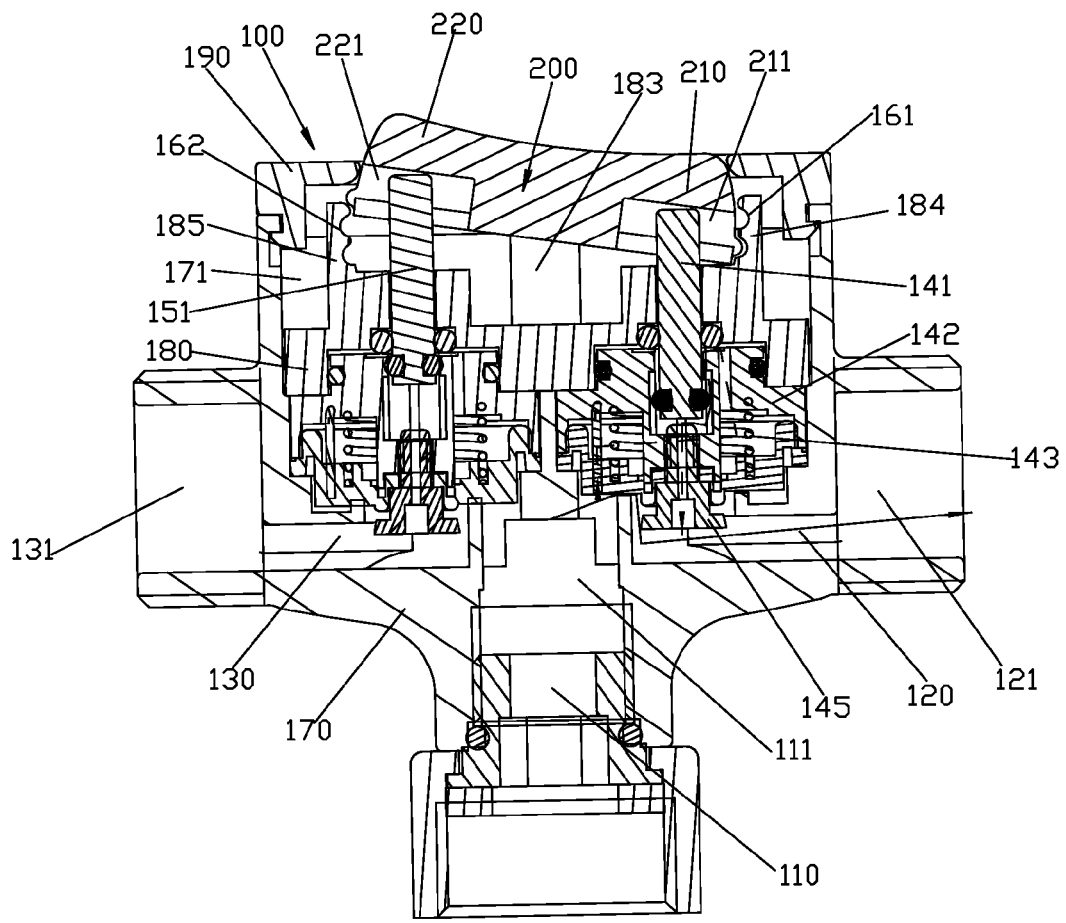
FIG. 4 illustrates the sectional view of the first embodiment when the three-way valve is situated in the first state.

The button 200 is pivot joint to the pivot seat 183, the button 200 can swing from side to side relatively to the fixation unit 100 and move among the first state, the second state, and the third state, thereinto:

When the button 200 is situated in the first state, the valve shaft I 141 is situated in the lower control position, the valve shaft II 151 is situated in the upper control position, the lock tooth I 212 of the connection part I 210 is coupled and locked to the lower lock groove of the control surface I 161, the lock tooth II 222 of the connection part II 220 is situated above the control surface II 162 and below the cover 190, the priority valve I 140 is turned on, the priority valve II 150 is cut off, so the water flows out of the outlet waterway I 120, and the outlet waterway II 130 is cut off, please refer to the FIG. 4;

When the button 200 is situated in the second state, the valve shaft I 141 is situated in the central control position, the valve shaft II 151 is situated in the central control position, the lock tooth I 212 of the connection part I 210 and the connection part II 220 are coupled and locked to the upper lock groove of the control surface I 161 and the control surface II 162, the priority valve I 140 and the priority valve II 150 are turned on, the water flows out of the outlet waterway I 120 and the outlet waterway II 130, please refer to the FIG. 5;

When the button 200 is situated in the third state, the valve shaft I 141 is situated in the upper control position, the valve shaft II 151 is situated in the lower control position, the lock tooth II 222 of the connection part II 220 is coupled and locked to the lower lock groove of the control surface II 162, the lock tooth I 212 of the connection part I 210 is situated above the control surface I 161 and below the cover 190, the priority valve II 150 is turned on, the priority valve I 140 is cut off, the water flows out of the outlet waterway II 130, and the outlet waterway I 120 is cut off, please refer to the FIG. 6.

The Second Embodiment

Figure 8:
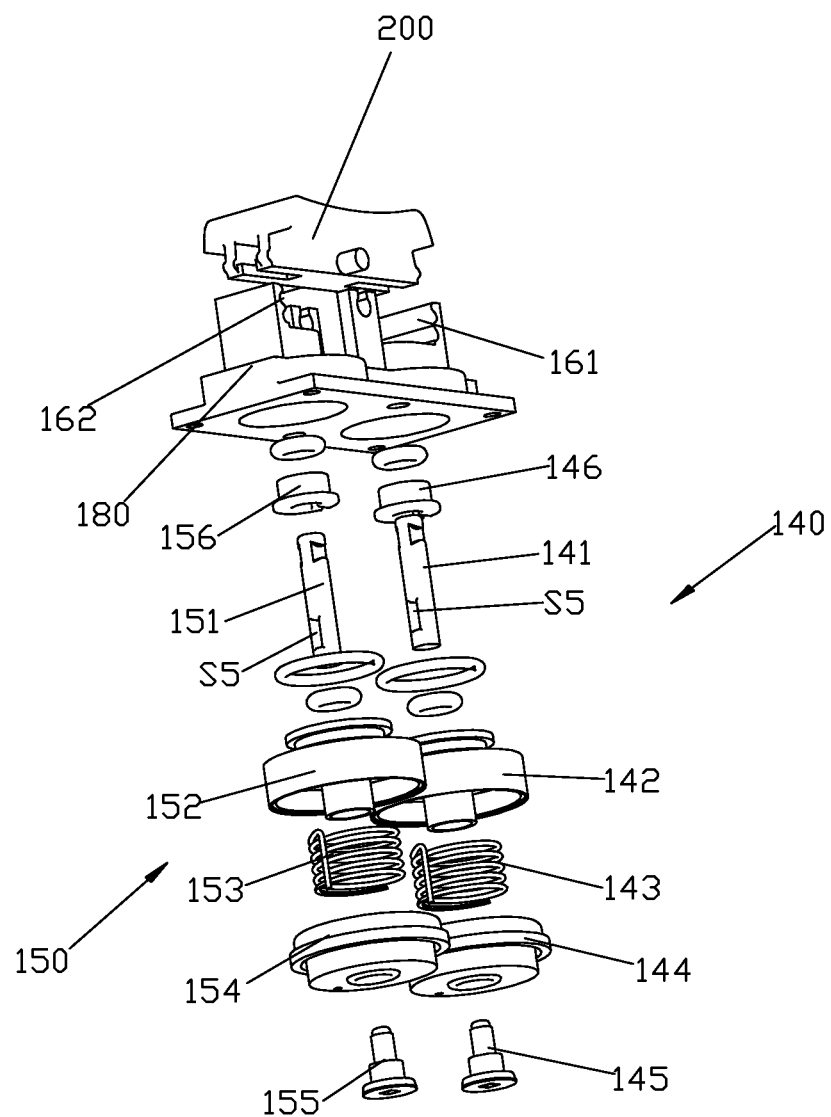
FIG. 8 illustrates the breakdown structure of the priority valve I, the priority valve II, the priority valve cover and the button of the second embodiment of the present invention.
Figure 9:
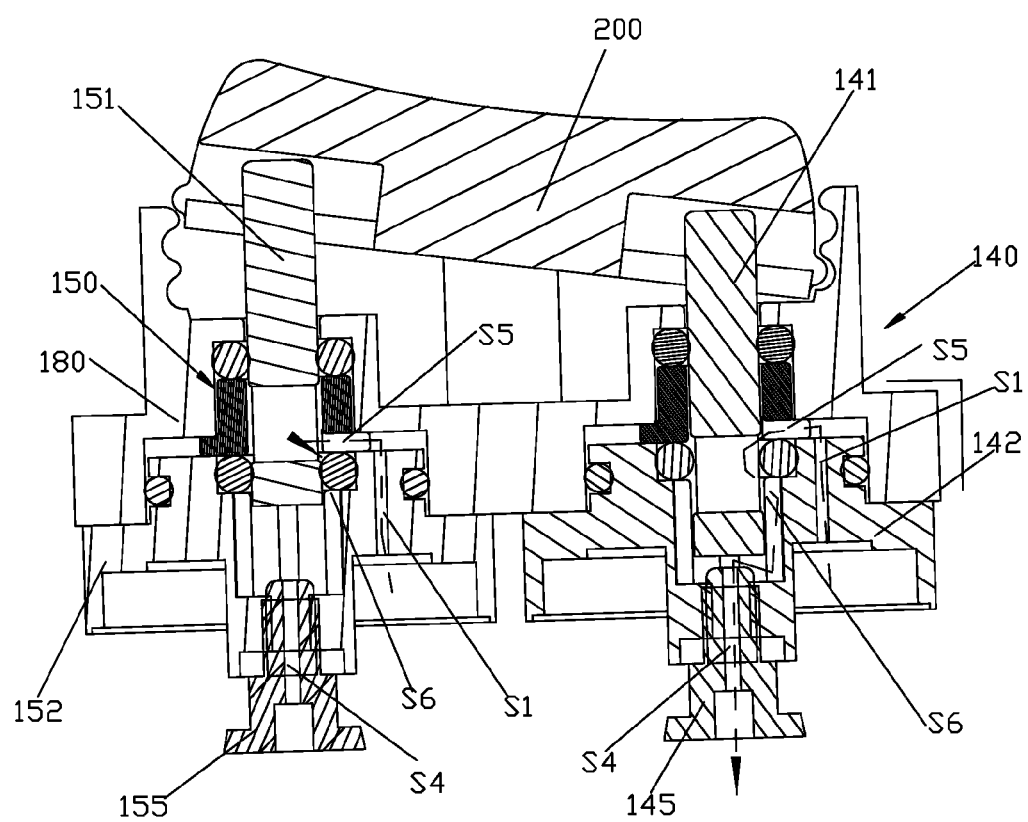
FIG. 9 illustrates the decompression of the priority valve I of the second embodiment.
Figure 10:
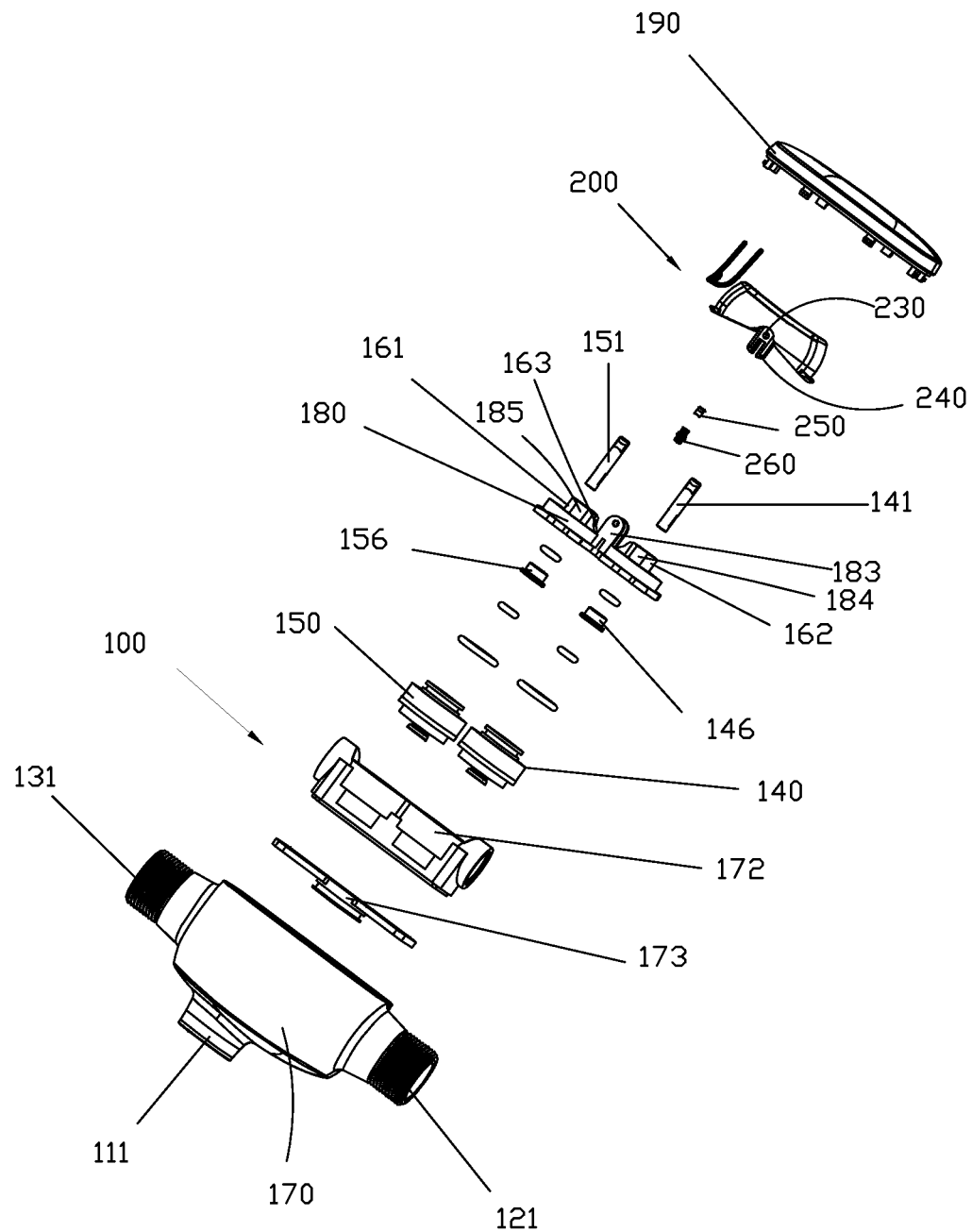
FIG. 10 illustrates the breakdown structure of the third embodiment of the present invention.
Figure 11:
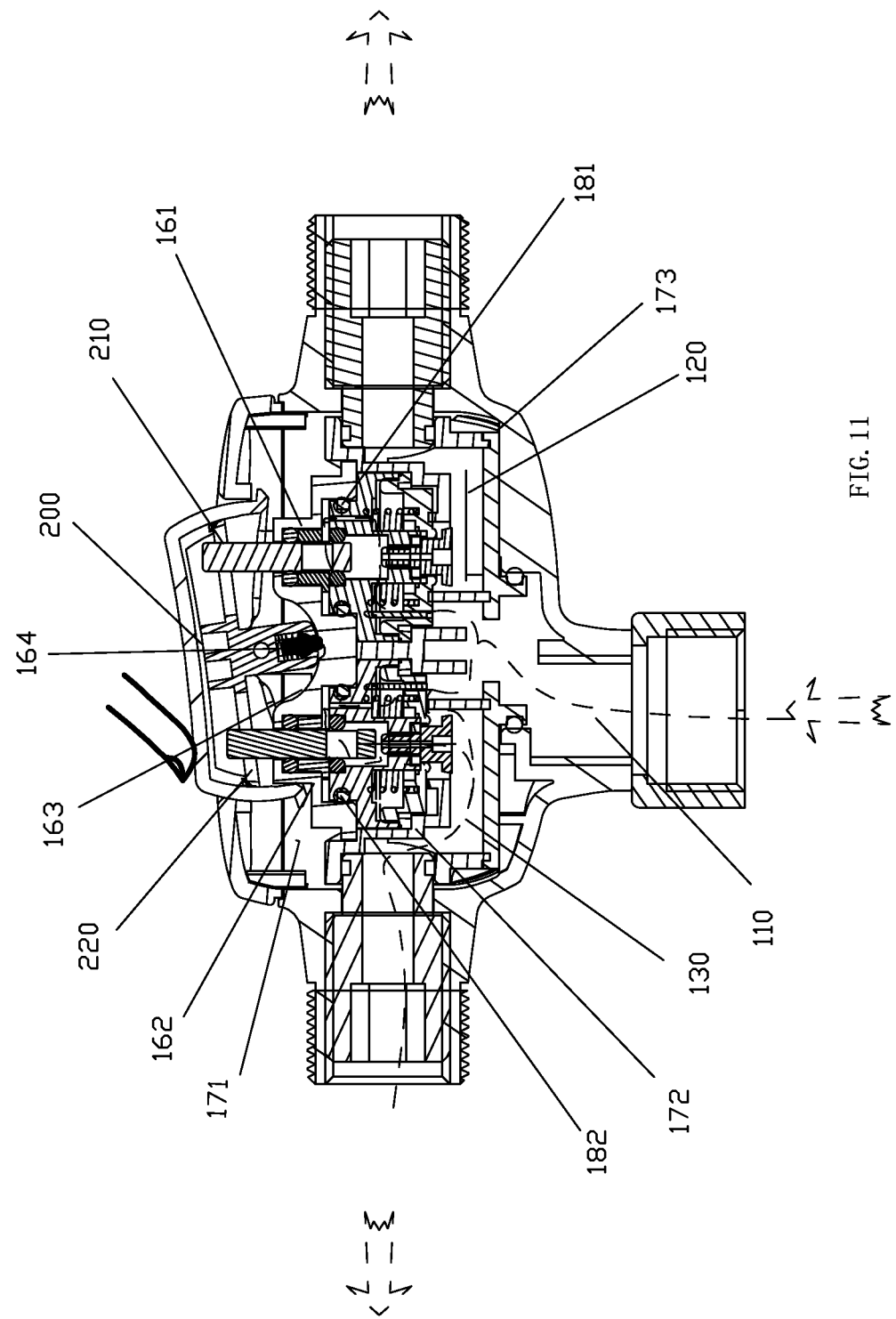
FIG. 11 illustrates the sectional view of the third embodiment when the three-way valve is situated in the first state.
Figure 12:
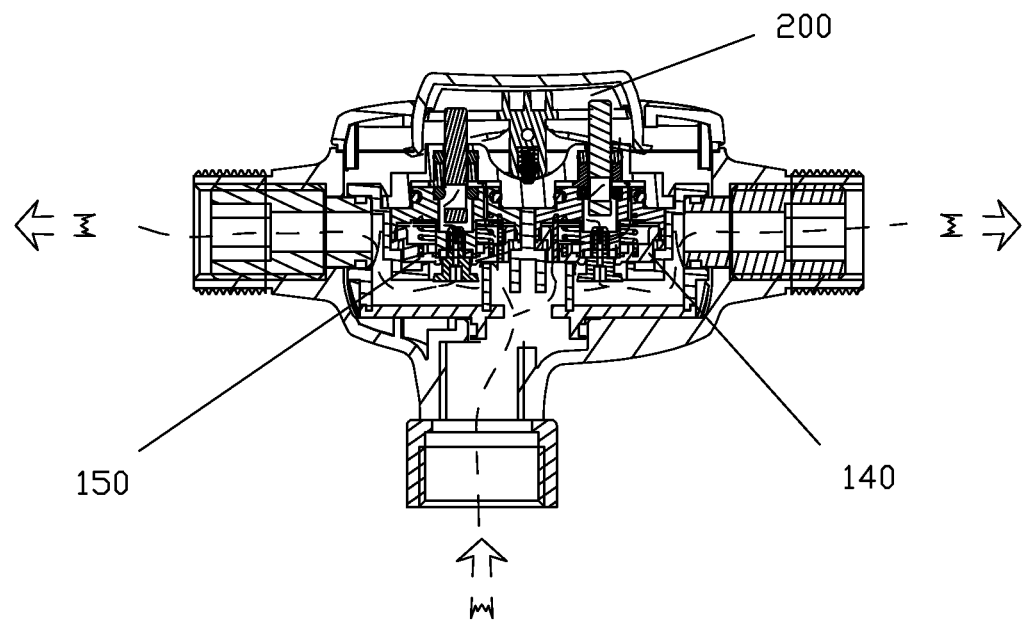
FIG. 12 illustrates the sectional view of the third embodiment when the three-way valve is situated in the second state.
Figure 13:
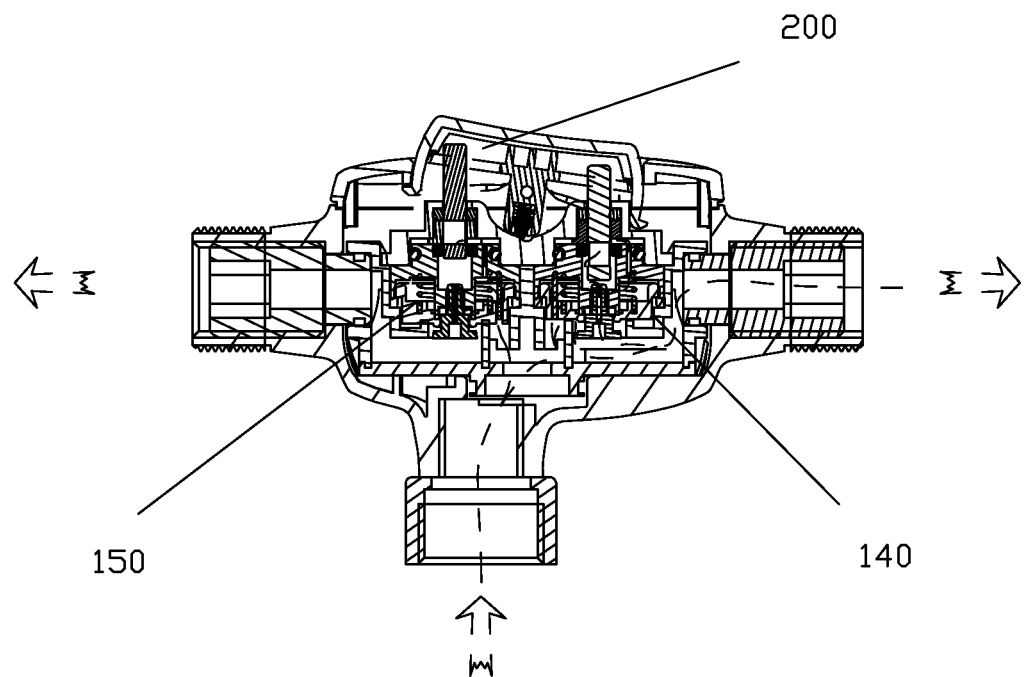
FIG. 13 illustrates the sectional view of the third embodiment when the three-way valve is situated in the third embodiment.

Please refer to the FIG. 8 and FIG. 9, which are provided with another embodiment of the button switch three-way valve.

The priority valve I 140 is disposed with a valve shaft I 1411, a priority valve body I 142, a spring I 143, a rubber block I 144, a priority valve spool I 145 and a gland I 146; and the priority valve II 150 is disposed with a valve shaft II 1511, a priority valve body II 152, a spring II 153, a rubber block II 154, a priority valve spool II 155 and a gland II 156. The priority valve I 140 and the priority valve II 150 are existing technology and not further described here. The valve shaft 141 and the valve shaft II 151 are separately sliding up and down in an upper, central and lower control position in the fixation unit 100. The decompression of the decompression waterway I of the priority valve I 140 is controlled by the sliding up and down of the valve shaft I 141, and the decompression of the decompression waterway II of the priority valve II 150 is controlled by the sliding up and down of the valve shaft II 151 (as figured in the broken line of the FIG. 9). Whether the priority valve I is turned on or not is controlled by the decompression of the decompression waterway I to control the outlet waterway 120 to connect to the inlet waterway 110, whether the priority valve II is turned on or not is controlled by the decompression of the decompression waterway II to control the outlet waterway 130 to connection to the inlet waterway 110. In this embodiment, the rubber block I 144 and the rubber block II 154 are separately disposed with a throughout thin hole, the spring I 143 and the spring II 153 are separately disposed with a plug end, which is plugged into the throughout thin hole. The water of the inlet waterway 110 flows into the rubber block I and the priority valve body I (the water receiver I) through the throughout thin hole; the water of the inlet waterway 110 flows into the rubber block II and the priority valve body II (the water receiver II) through the throughout thin hole. The decompression waterway I includes a damping hole I S1 disposed in the priority valve body I and connected to the water receiver I, a block groove I S5, a central groove I S6 disposed in the valve shaft I, a groove I S3 disposed in the priority valve body I and a central hole I S4 of the valve spool I. The decompression waterway II includes a damping hole II S1 disposed in the priority valve body II and connected to the water receiver II, a block groove II S5, a central groove II S6 disposed in the valve shaft II, a groove II S3 disposed in the priority valve body II and a central hole II S4 of the valve spool II. As figured in the FIG. 9, when the valve shaft II 150 is situated in the upper control position, it's blocked between the block groove II S5 and the groove II S3 of the priority valve body II, the decompression waterway II is closed, the priority valve II 150 is cut off, the outlet waterway II 130 is not connected to the inlet waterway 110; as figured in the FIG. 9, when the valve shaft I 140 is situated in the central and lower control position, the block groove I S5 is connected to the groove I S3 of the priority valve body through the central groove I S6, the water flows through the damping hole I of the priority valve body I, the block groove I, the central groove I of the valve shaft I, the groove of the priority valve body I and the valve spool I, then it decompresses, the priority valve I 140 is turned on.

The control surface I 161 and the control surface II 162 are separately disposed with three lock grooves, the button 200 can swing from side to side relatively to the fixation unit 100 and move among the first state, the second state, and the third state, thereinto:

When the button 200 is situated in the first state, the lock tooth I 212 of the connection part I 210 is coupled and locked to the lower lock groove of the control surface I 161, the lock tooth II 222 of the connection part II 220 is situated in the upper lock groove of the control surface II 162, the priority valve I 140 is turned on, the priority valve II 150 is cut off;

When the button 200 is situated in the second state, the lock tooth I 212 of the connection part I 210 is coupled and locked to the lock grooves I 1611 of the control surface I 161 and the lock tooth II 222 of the connection part II 220 is coupled and locked to the lock grooves II 1621 of the control surface II 162, the priority valve I 140 and the priority valve II 150 are turned on;

When the button 200 is situated in the third state, the lock tooth II 222 of the connection part II 220 is coupled and locked to the lower lock groove of the control surface II 162, the lock tooth I 212 of the connection part I 210 is situated in the upper lock groove of the control surface I 161, the priority valve II 150 is turned on, the priority valve I 140 is cut off.

The Third Embodiment

Refer to the FIG. 10 to FIG. 13, which is provided with another embodiment of the button switch three-way valve.

A button switch three-way valve includes a fixation unit 100. The fixation unit 100 is disposed with an inlet waterway 110, an outlet waterway I 120 and an outlet waterway II 130. The priority valve I 140 has a valve shaft I 141 and the priority valve II 150 has a valve shaft II 151. the on-off of the outlet waterway 120 to the inlet waterway 110 is controlled by the sliding of the valve shaft I 141, the on-off of the outlet waterway II 130 to the inlet waterway 110 is controlled by the sliding of the valve shaft II 151;

The fixation unit 100 includes a body 170, a priority valve cover 180 and a cover 190. The body 170 includes an inlet 111, an outlet I 121, an outlet II 131 and an assembly groove 171. The assembly groove 171 is connected the inlet 111 to the outlet I 121 and the outlet II 131. In this embodiment, the body 170 is further disposed with a lower board 173 and a valve seat 172.

The central of the top surface of the priority valve cover 180 is disposed with a pivot seat 183, the pivot seat 183 is disposed with a pivot hole; two sides of the top surface of the priority valve cover 180 are disposed with a control seat I 184 and a control seat II 185, the opposite surfaces of the control seat I 184 and the control seat II 185 are the control surface I 161 and the control surface II 162, a sliding groove 163 is disposed between the control seat I 184 and the control seat II 185, a positioning concave spot 164 is disposed in the central of the sliding groove.

The priority valve I 140 and the priority valve II 150 are separately assembled inside the big hole of the stepped hole I 181 and the stepped hole II 182 of the priority valve cover 180, making the ends of the valve shaft I 141 and the valve shaft II 151 separately sliding and running through the small hole of the stepped hole I 181 and the stepped hole II 182. The priority valve cover 180 is assembled inside the body 170 to form above inlet waterway 110, the outlet waterway I 120 and the outlet waterway II 130. The priority valve I 140 is disposed between the outlet waterway I 120 and the inlet waterway 110, and the priority valve II 150 is disposed between the outlet waterway II 130 and the inlet waterway 110. The on-off of the outlet waterway I 120 to the inlet waterway 110 is controlled by the priority valve I 140, the on-off of the outlet waterway II 130 to the inlet waterway 110 is controlled by the priority valve II 150.

The button 200 is disposed with a central part 270, a connection part I 210 and a connection part II 220 in the two sides of the central part 270; the front and back of the central part 270 are convex and disposed with a pivot shaft 230, the central part 270 is extended downward with a guiding sleeve 240, the spring 250 and the elastic contract 260 are assembled in the guiding sleeve 240 in order;

The pivot shaft 230 of the button 200 is pivot joint to the pivot hole of the pivot seat 183, the elastic contact 260 can slide along the sliding groove 163; the button 200 can be assembled out of the control surface I 161 and the control surface II 162, a clearance is disposed between the inner wall of one end of the button 200 and the control surface I 161, a clearance is disposed between the inner wall of the other end of the button 200 and the control surface II 162.

The cover 190 is covered on the body 170, the cover 190 is disposed with a through hole 191, the through hole 191 is corresponding to the priority valve cover 180, the button 200 is exposed out of the through hole 191 for user's press, the connection part I 210 and the connection part II 220 of the button 200 can not be detached from the through hole 191.

The button 200 can swing from side to side relatively to the fixation unit 100 and can be situated in a first state, a second state, and a third state, thereinto:

When the button 200 is situated in the first state, the inner wall of one side of the button 200 is withstood the control surface I 161, the priority valve II 150 is turned on, the priority valve I 140 is cut off;

When the button 200 is situated in the second state, the elastic contact 260 of the button 200 is situated in the positioning concave spot 164 of the sliding groove 163, the priority valves I 140 and the priority valve II 150 are turned on;

When the button 200 is situated in the third state, the inner wall of one side of the button 200 is withstood the control surface II 162, the priority valve I 140 is turned on, the priority valve II 150 is cut off.

The Fourth Embodiment

Figure 14:
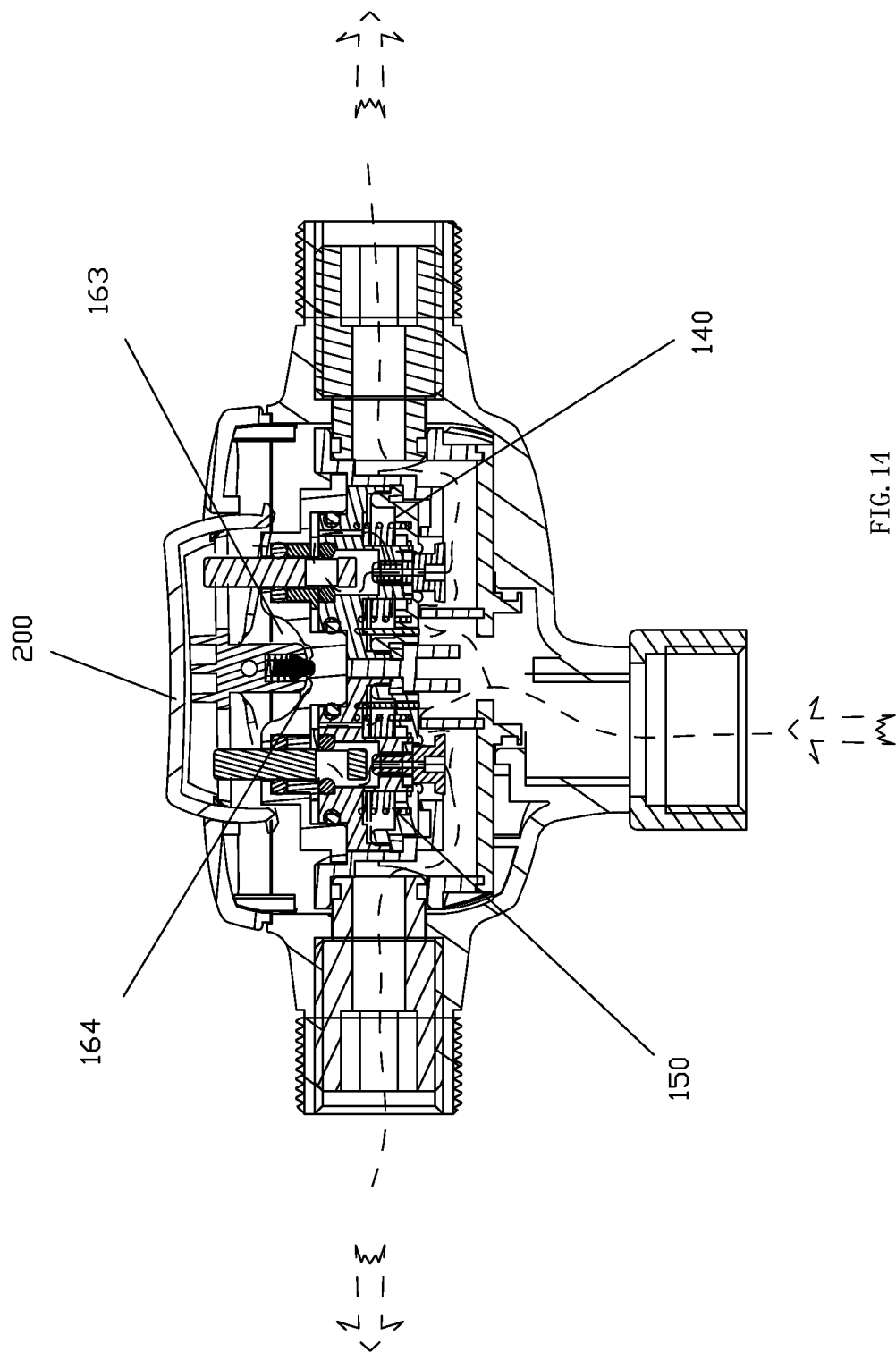
FIG. 14 illustrates the sectional view of the fourth embodiment when the three-way valve is situated in the second embodiment.

Refer to the FIG. 14, which is provided with an embodiment of the button switch three-way valve. The difference from the third embodiment is that: the positioning of the three state of the button 200 is different. The sliding groove 163 of this embodiment is disposed with three positioning concave spots. Press the button to make the elastic contact 260 situated in different positioning concave spot of the sliding groove 163, different state can be positioned and realized even the inner wall of one side of the button 200 is not withstood the control surface.

As design required, the sliding groove 163 can be disposed with two positioning concave spots.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

INDUSTRIAL APPLICABILITY

The present invention is provided with a button switch three-way valve. The on-off of the outlet waterway to the inlet waterway is controlled by the sliding of the valve shaft controlled by the button. The structure is simple and the switch is easy and convenient.

What is claimed is:

1. A button switch three-way valve includes a fixation unit, the fixation unit is provided with an inlet waterway and first and second outlet waterways, first and second priority valves are disposed between each respective outlet waterway and the inlet waterway, first and second priority valves are provided with first and second valve shafts respectively, the switching of each outlet waterway to the inlet waterway is controlled by the sliding of the respective valve shaft;

wherein the fixation unit is provided with first and second control surfaces opposite to each other, each control surface provided with upper and lower lock grooves;

a button is further disposed between the two control surfaces, the button is provided with a central part and two connection parts in the two sides of the central part, the central part is pivotably jointed to the fixation unit, two connection parts are separately connected to the two valve shafts to control the sliding of the two valve shafts, the exterior sides of each of the two connection parts are provided with a separate lock tooth to couple to the lock grooves;

the button can swing relatively to the fixation unit from side to side and can be situated in a first state, a second state and a third state, thereinto:

when the button is situated in the first state, the lock tooth of the first connection part is coupled to the lower lock groove of the first control surface, the lock tooth of the second connection part is situated above the second control surface, the first priority valve is turned on, the second priority valve is cut off;

when the button is situated in the second state, the lock teeth of the first and second connection parts are coupled to the upper lock grooves of the first and second control surfaces, the first and second priority valves are turned on;

when the button is situated in the third state, the lock tooth of the second connection part is coupled to the lower lock groove of the second control surface, the lock tooth of the first connection part is situated above the first control surface, the second priority valve is turned on, the first priority valve is cut off.

2. A button switch three-way valve according to the claim 1, wherein the fixation unit includes a body and a priority valve cover; the body is provided with an inlet, two outlets and an assembly groove;

the assembly groove is disposed to connect the inlet to the two outlets;

the priority valve cover is provided with two stepped holes, each having a larger diameter and a smaller diameter, the two priority valves are separately assembled to the larger diameter of the two stepped holes, making the end of the two valve shafts separately sliding and running through the smaller diameter of the two stepped holes;

the priority valve cover is assembled in the assembly groove of the body to form the inlet waterway and outlet waterways, making each outlet waterway and inlet waterway connected to the respective first and second priority valves.

3. A button switch three-way valve according to the claim 2, wherein the top surface of the button is concaved and arc shaped.

4. A button switch three-way valve according to the claim 2, wherein the priority valve cover is provided with a pivot seat in a center of the priority valve cover, the pivot seat is provided with a pivot groove;

two sides of the priority valve cover are separately provided with a control seat, the opposite sides of the two control seats are the two control surfaces;

the central of the button is pivotably jointed to the pivot groove of the pivot seat.

5. A button switch three-way valve according to the claim 4, wherein the top surface of the button is concaved and arc shaped.

6. A button switch three-way valve according to claim 4, wherein the fixation unit further includes a cover,
the cover covers on the body,
the cover is provided with a through hole,
the through hole corresponds to the priority valve cover and,
the button protrudes out of the through hole.

7. A button switch three-way valve according to the claim 6, wherein the top surface of the button is concaved and arc shaped.

8. A button switch three-way valve according to the claim 4, wherein the valve shaft is concaved and provided with a sliding groove; the two connection parts of the button are provided with a connection groove with an opening down-facing facing down, the opening of the connection groove is extended inwards to form a connection edge;

the two valve shafts are separately connected to the two connection grooves; the connection edges of the two connection grooves are separately coupled and connected to the sliding grooves.

9. A button switch three-way valve according to the claim 8, wherein the top surface of the button is concaved and arc shaped.

10. A button switch three-way valve according to the claim 1, wherein the top surface of the button is concaved and arc shaped.

11. A button switch three-way valve according to the claim 1, wherein the top surface of the button is concaved and arc shaped.

12. A button switch three-way valve includes a fixation unit, the fixation unit is provided with an inlet waterway and first and second outlet waterways, first and second priority valves are disposed between each respective outlet waterway and the inlet waterway, first and second priority valves are provided with respective first and second valve shafts, the switching of each outlet waterway to the inlet waterway is controlled by sliding of the respective valve shaft;

wherein the fixation unit is provided with first and second control surfaces opposite to each other, each control surface provided with upper, central and lower lock grooves;

a button is further disposed between the first and second control surfaces, the button is provided with a central part and two connection parts in the two sides of the central part, the central part is pivotably jointed to the fixation unit, two connection parts are separately connected to the two valve shafts to control the sliding of the two valve shafts, the exterior sides of each connection part having a separate lock tooth to couple to the lock grooves, the button can swing relatively to the fixation unit from side to side and can be situated in a first state, a second state and a third state, thereinto:

when the button is situated in the first state, the lock tooth of the first connection part is coupled to the lower lock groove of the first control surface, the lock tooth of the second connection part is situated in the upper lock groove of the second control surface, the first priority valve is turned on, the second priority valve is cut off;

when the button is situated in the second state, the lock teeth of the first and second connection parts are coupled to the central lock groove of the first and second control surfaces, the first and second priority valves are turned on;

when the button is situated in the third state, the lock tooth of the second connection part is coupled to the lower lock groove of the second control surface, the lock tooth of the first connection part is situated in the upper lock groove of the first control surface, the second priority valve is turned on, the first priority valve is cut off.

13. A button switch three-way valve according to the claim 12, wherein the top surface of the button is concaved and arc shaped.

14. A button switch three-way valve includes a fixation unit, the fixation unit is provided with an inlet waterway and two outlet waterways, first and second priority valves are disposed between each outlet waterway and the inlet waterway, each priority valve is provided with a valve shaft, the switching between the outlet waterways connected to the inlet waterway is controlled by the sliding of the valve shaft;

wherein the button is provided with a central part and two connection parts in the two sides of the central part, the central part is pivotably jointed to the fixation unit, two connection parts are separately connected to the two valve shafts to control the sliding of the two valve shafts, wherein the fixation unit is provided with first and second opposite control surfaces;

a sliding groove is disposed between the two control surfaces, a central part of the sliding groove is provided with at least a positioning concave spot;

an elastic contact is disposed below the central part of the button to slide along the sliding groove, the button is assembled outside the two control surfaces, two clearances are separately disposed between inner walls of two ends of the button and the two control surfaces; the button can swing from side to side relatively to the fixation unit and can be situated in a first state, a second state and a third state, thereinto:

when the button is situated in the first state, the inner wall of one side of the button impinges on the first control surface, the second priority valve is turned on, the first priority valve is cut off;

when the button is situated in the second state, the elastic contact of the button is situated in the positioning concave spot of the sliding groove; the first and second priority valves are turned on;

when the button is situated in the third state, the inner wall of one side of the button impinges on the second control surface, the first priority valve is turned on, and the second priority valve is cut off.

* * * * *